United States Patent
Panicker et al.

(10) Patent No.: US 10,938,862 B1
(45) Date of Patent: Mar. 2, 2021

(54) METHOD AND SYSTEM FOR MANAGING MOBILE ASSETS USING A DECENTRALIZED NETWORK

(71) Applicant: Wipro Limited, Bangalore (IN)

(72) Inventors: Vinod Ramachandra Panicker, Kochi (IN); Sumod Rajan George, Ernakulam (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/835,944

(22) Filed: Mar. 31, 2020

(30) Foreign Application Priority Data

Mar. 30, 2020 (IN) .............................. 202041013878

(51) Int. Cl.
*H04L 29/06* (2006.01)
*H04W 76/11* (2018.01)
*H04L 9/06* (2006.01)
*H04W 12/06* (2021.01)

(52) U.S. Cl.
CPC ............ *H04L 63/20* (2013.01); *H04L 9/0637* (2013.01); *H04L 63/08* (2013.01); *H04L 63/102* (2013.01); *H04W 12/06* (2013.01); *H04W 76/11* (2018.02); *H04L 2209/38* (2013.01)

(58) Field of Classification Search
CPC ....... H04L 63/20; H04L 9/0637; H04L 63/08; H04L 63/102; H04L 2209/38; H04L 63/108; H04L 9/3242; H04W 76/11; H04W 12/06; H04W 12/08; G07C 9/00174
See application file for complete search history.

(56) References Cited

U.S. PATENT DOCUMENTS

| | | | |
|---|---|---|---|
| 10,257,680 B2 | 4/2019 | Quarto et al. | |
| 10,373,158 B1 * | 8/2019 | James | G06Q 20/40 |
| 10,540,654 B1 * | 1/2020 | James | G06Q 20/223 |
| 10,554,401 B1 * | 2/2020 | Lee | G06K 7/1417 |
| 2019/0026821 A1 * | 1/2019 | Bathen | G06Q 40/00 |
| 2019/0080407 A1 * | 3/2019 | Molinari | G06Q 20/223 |
| 2019/0303579 A1 * | 10/2019 | Reddy | G06F 21/57 |
| 2020/0279321 A1 * | 9/2020 | Wang | G06Q 20/3674 |

FOREIGN PATENT DOCUMENTS

WO 2019120493 A1 6/2019

* cited by examiner

*Primary Examiner* — Ernest G Tacsik
(74) *Attorney, Agent, or Firm* — Finnegan, Henderson, Farabow, Garrett & Dunner, LLP (57) ABSTRACT

The present disclosure discloses system and method for managing mobile assets using a decentralized network. The system comprises asset network, affiliated organization network and agent network. A managing application in agent network receives service request for one or more mobile assets from user. The service request is associated with purpose information and location information. Upon receiving service request, managing application retrieves mobile assets for service request from affiliated organization network upon verification of service request. Thereafter, managing application allocates mobile asset from one or more mobile assets for service request. Further, managing application provides first identifier to user and second identifier for allocated mobile asset. The first identifier and second identifier is presented by user and allocated mobile asset with each other. Upon successful verification of exchange of first identifier and second identifier from user application and mobile asset application, the managing application initiates service associated with service request.

19 Claims, 9 Drawing Sheets

METHOD AND SYSTEM FOR MANAGING MOBILE ASSETS USING A DECENTRALIZED NETWORK

TECHNICAL FIELD

The present subject matter is generally related to asset management and more particularly, but not exclusively, to a system and a method for managing mobile assets using a decentralized network.

BACKGROUND

Digitization is a key in the business world today, influencing every segment of business in one way or other. This has led to creation of disruption in traditional business models. There exists few of the business entities, which are leaders in disrupting the traditional business models. However, these models have created increased revenue opportunities and it has been driven by centralization of control with specific entities. In case of shared mobility services, centralization of control has limited ability to scale-up and often customers are left with a limited set of options. In such cases, additional cost in terms of human effort must be expanded to manage the mobile assets. The magnitude and complexity of manual management of these mobile assets increases with increase in the geographies involved. Conventional vehicle manufacturers are embedded with capabilities that will enable to track it but there does not exist a system that would enable tracking of mobile assets in large quantities spread across geographies. Further, activities such as authentication and authorization of the mobile assets for specific tasks, managing and tracking them have become a complex issue with the conventional centralized systems.

Further, the conventional systems lack ability to generate, register, and share contract information with an owner of the mobile asset, which is not decentralized in nature. The existing systems assumes the identity of the user device as valid without validating it using the decentralized network and this could permit any user devices to falsify its actual identity and secure authentication to the network. Further, the existing systems focuses on the authentication of user devices and not the user who is in possession of the device. Also, the existing systems do not state how long the authentication is valid for and how it could be revoked if the user device has been identified to be engaged in malicious activities and thus leading to misuse of the mobile assets.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a system for managing mobile assets using a decentralized network. The system comprises an asset network, an affiliated organization network and an agent network. A managing application of the agent network is configured to receive a service request for one or more mobile assets, from a user. The service request is associated with a purpose information comprising usage details of the one or more mobile assets and a location information. The one or more mobile assets, one or more users associated with one or more mobile assets and one or more devices associated with each of the one or more users are registered with the asset network. Thereafter, the managing application retrieves the one or more mobile assets for one of the service request or servicing the received service request based on the purpose information and the location information from the affiliated organization network upon verification of the service request. Once the one or more mobile assets are retrieved, the managing application allocates a mobile asset from the one or more mobile assets for the service request. Further, the managing application provides a first identifier to the user to avail the allocated mobile asset and providing a second identifier for the allocated mobile asset for consumption of the mobile asset, wherein the first identifier and the second identifier is exchanged between the user and the allocated mobile asset, and wherein the exchange of the first identifier and the second identifier is verified by a user application through which the service request is provided and a mobile asset application associated with the allocated mobile asset, wherein the user application is associated with the user. Thereafter, the managing application initiates a service associated with the service request upon successful verification of the exchange of the first identifier and the second identifier from the user application and the mobile asset application.

Further, the present disclosure discloses a method for managing mobile assets using a decentralized network. The method comprises receiving, by a managing application in an agent network, a service request for one or more mobile assets, from a user. The service request is associated with a purpose information comprising usage details of the one or more mobile assets and a location information. The one or more mobile assets, one or more users associated with one or more mobile assets and one or more devices associated with each of the one or more users are registered with an asset network. The method also comprises retrieving, by the managing application, the one or more mobile assets for one of the service request or servicing the received service request based on the purpose information and the location information from an affiliated organization network upon verification of the service request. Thereafter, the method comprises allocating a mobile asset from the one or more mobile assets for the service request. Once the mobile asset is allocated, the method comprises providing, by the managing application, a first identifier to the user to avail the allocated mobile asset and providing a second identifier for the allocated mobile asset for consumption of the mobile asset, wherein the first identifier and the second identifier is exchanged between the user and the allocated mobile asset, and wherein the exchange of the first identifier and the second identifier is verified by a user application through which the service request is provided and a mobile asset application associated with the allocated mobile asset, wherein the user application is associated with the user. Thereafter, the method comprises initiating, by the managing application, a service associated with the service request upon successful verification of the exchange of the first identifier and the second identifier from the user application and the mobile asset application.

Furthermore, the present disclosure comprises a non-transitory computer readable medium including instructions stored thereon that when processed by at least one processor of a managing application causes the processor to manage mobile assets using a decentralized network. The instructions cause the processor to receive service request for one or more mobile assets, from a user, wherein the service request is associated with a purpose information comprising usage details of the one or more mobile assets and a location information, wherein the one or more mobile assets, one or more users associated with one or more mobile assets and one or more devices associated with each of the one or more users are registered with an asset network. The instructions causes the processor to retrieve the one or more mobile assets for one of the service request or servicing the received service request based on the purpose information and the location information from an affiliated organization network upon verification of the service request. Thereafter, the instructions causes the processor to allocate, by the managing application, a mobile asset from the one or more mobile assets for the service request. Further, the instructions causes the processor to provide a first identifier to the user to avail the allocated mobile asset and providing a second identifier for the allocated mobile asset for consumption of the mobile asset, wherein the first identifier and the second identifier is presented by the user and the allocated mobile asset to each other, and wherein the exchange of the first identifier and the second identifier is verified by a user application through which the service request is provided and a mobile asset application associated with the allocated mobile asset, wherein the user application is associated with the user. The instructions causes the processor to initiate a service associated with the service request upon successful verification of the exchange of the first identifier and the second identifier from the user application and the mobile asset application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternatives falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure discloses a system and a method for managing mobile assets using a decentralized network. The system (Verifiable Asset network) is a network of networks which comprises of an asset network, an affiliated organization network and an agent network. The asset network may be hosted by one or more enterprises affiliated to provide mobile asset-based services. The affiliated organization network is created by owners of the one or more mobile assets or organizations or associations providing the one or more mobile assets for consumption. The agent network is created to host decentralized applications by organizations providing these decentralized applications. In an embodiment, one of the decentralized application such as a managing application in the agent network may receive a service request for one or more mobile assets, from a user. The user may provide the service request through a user application configured in a computing device associated with the user. The service request may be associated with a purpose information comprising usage details of the one or more mobile assets and a location information. In an embodiment, the one or more mobile assets, one or more users associated with one or more mobile assets and one or more devices associated with each of the one or more users are registered with the asset network. Upon receiving the service request, the managing application may retrieve one or more mobile assets for one of the service request or servicing the received service request based on the purpose information and the location information from the affiliated organization network upon verification of the service request. The service request may be verified by verifying eligibility of the user providing the service request, eligibility of one or more mobile assets suiting the requirements of the service request and verifying availability of the user for consuming the requested service. Thereafter, the managing application may allocate a mobile asset from the one or more mobile assets for the service request. Further, the managing application may provide a first identifier to the user to avail the allocated mobile asset and provide a second identifier for the allocated mobile asset for consumption of the mobile asset. Thereafter, a challenge process is implemented wherein the first identifier and the second identifier are presented as proofs to the user and the allocated mobile asset and the proofs are exchanged which is verified by the user application and a mobile asset application associated with the allocated mobile asset using a zero knowledge proof mechanism. In an embodiment, the first identifier and the second identifier may be generated based on identity details of the user, identity details of the mobile asset, the purpose of the service request, eligibility of the user to consume the mobile asset for the requested service, eligibility of the mobile asset to be consumed for the requested service. Upon successful verification of the exchange of the first identifier and the second identifier from the user application and the mobile asset application, the managing application may initiate a service associated with the service request. Thereafter, a status tracking application in the agent network may track status of the service through the user application and the mobile asset application. Once the service is completed, a feedback initiating application in the agent network may initiate feedback request to receive feedback for the service from the user. The received feedback may be stored in a registry of the affiliated organization network. In this manner, the present disclosure provides an efficient mechanism for managing mobile assets in a decentralized manner using decentralized identifiers. In the present disclosure each of the network is hosted based on different set of entities and are generated as the decentralized network using a block chain mechanism. Unlike conventional networks, the generated system which is a network of verifiable assets enables interaction between the entities of networks (i.e., the asset network, the affiliated organization network, and the agent network) and each of the network is generated for a specific purpose. By generating the network of verifiable assets ensures that, no single entity shall be able to centrally control the network for any manipulation purpose. This helps to enhance trust on the networks and offers equal opportunity for everyone to offer service and user to consume the service in the decentralized manner without compromising on the privacy of users and the mobile assets.

Figure 1A:
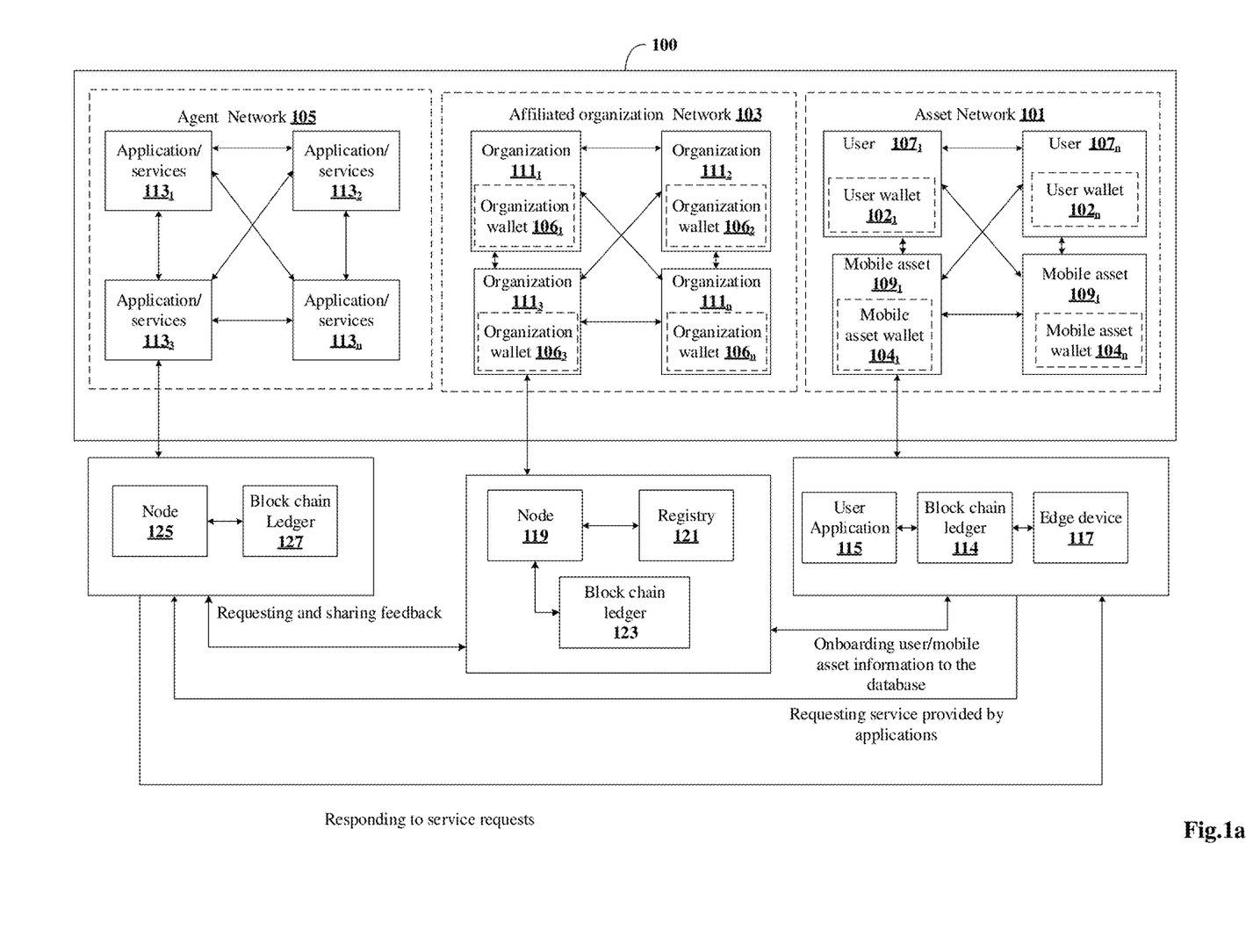
FIG. 1a shows a system for managing mobile assets using a decentralized network in accordance with some embodiments of the present disclosure.

FIG. 1a shows a system for managing mobile assets using a decentralized network in accordance with some embodiments of the present disclosure.

The system 100 (Verifiable Asset network) is a network of networks which comprises of an asset network 101, an affiliated organization network 103 and an agent network 105.

The asset network 101 may be hosted by one or more enterprises affiliated to provide mobile assets-based services. The asset network 101 may include one or more users (alternatively referred as consumers) such as user $107_1$ to user $107n$ (collectively referred as users 107) and one or more mobile assets such as mobile asset $109_1$ to mobile asset $109n$ (collectively referred as mobile assets 109). The one or more users 107, the one or more mobile assets 109 and one or more devices associated with the one or more users 107 and the one or more mobile assets 109 may be registered or on-boarded with the asset network 101. The information of the one or more users 107 and the one or more mobile assets 109 on-boarded with the asset network 101 is stored in a registry 121 of the affiliated organization network 103. The one or more devices may include, but not limited to, a mobile phone, a tablet and any other computing device capable of providing a service request and communicating with other computing devices. Each of the one or more user devices may be configured with a user wallet 102 along with user application 115. A user (such as the user $107_1$) from the one or more users 107 may provide a service request using the user application $115_1$. The service request may be for consuming one or more mobile assets 109. As an example, the service request may be to "avail a car for rent". Therefore, the mobile asset $109_1$ in this scenario is a "car". The user application $115_1$ may enable the user $107_1$ to communicate with other participants in the system 100. Using the user application $115_1$, the user $107_1$ may also share identifiers with participants in the network either for consuming the mobile asset $109_1$ associated with the requested service or for gaining access to the mobile asset $109_1$. While sharing the identifiers, the user application $115_1$ may encrypt the identifier with a public key of the receiver of the identifier. In an embodiment, each of the one or more mobile assets 109 may be associated with an Internet of Things (IOT) device also referred as edge device 117 which comprises mobile asset wallet 104 along with mobile asset application through which the mobile assets 109 may communicate with other participants in the system 100. Further, the mobile asset application may be used for sharing identifiers with other participants in the network and for authentication and authorization for consuming the mobile asset $109_1$ by the authorized user $107_1$. The block chain ledger 114 may include data, which is secured, and each block is linked with each other cryptographically. The data in the block is immutable and every new set of transaction results in a new block being created and added to the list of blocks based on consensus protocol adhered by asset network 101 on the block chain network.

The affiliated organization network 103 may be created by owners of one or more mobile assets 109 or organizations or associations providing the one or more mobile assets 109 for consumption. As shown in FIG. 1a, the affiliated organization network 103 may include one or more organizations such as organization $111_1$ to organization $111n$ (collectively referred as organizations 111). Each of these organization may include a registry 121, a node $119_1$ and a distributed ledger like a block chain. The registry 121 may include details of one or more users 107 and one or more mobile assets 109 on-boarded with the asset network 101. The details may also include usage types defined for each of the one or more mobile assets 109, consent from owners of the mobile assets 109 and historical data of the one or more users 107 who are associated with the organization. In an embodiment, the registry 121 is not owned by a single entity rather it is decentralized in nature thus, ensuring that the data in the registry 121 is not manipulated by any single entity.

The registry 121 provides information to the applications hosted on the agent network 105 for initial validation process while servicing the service request received from the user 107. In an embodiment, each of the one or more organizations 111 may include organization wallet 106 to store the issued proofs and credentials for the users 107 and the mobile assets 109. The node 119 is the infrastructure element which includes a local block chain ledger and other application components which permit interaction between the nodes 119 and storing the data into the local block chain ledger. The block chain ledger 123 is a list of blocks that contains data, which is secured, and each block is linked with each other cryptographically. The data in the block is immutable and every new set of transaction results in a new block being created and added to the list of blocks based on consensus protocol adhered by the nodes 119 on the block chain network. Every node 119 on the block chain network will have a local copy of the block chain ledger 123.

The agent network 105 may be created to host decentralized applications by organizations 111 providing these decentralized applications. The decentralized applications may have specific workflows for authentication, authorization, tracking and management of the mobile assets 109. As shown in FIG. 1a, the agent network 105 may include one or more applications or services or agents such as application/services $113_1$ to application/services $113n$ [also referred as application/service 1 $113_1$, application/service 2 $113_2$ and application/service 3 $113_3$ in the below description]. Each application may include a node 125 and a block chain ledger 127. The one or more applications 113 in the agent network 105 may include, but not limiting to, onboarding application, service application, status reporting application, service tracking application and service feedback initiation application. The node 125 provides the capability to the application 113 to interact with other participants in the system 100. The block chain ledger 127 may include data, which is secured, and each block is linked with each other cryptographically. The data in the block is immutable and every new set of transaction results in a new block being created and added to the list of blocks based on consensus protocol adhered by the nodes 125 on the block chain network. Every node 125 on the block chain network will have a local copy of the block chain ledger 127.

In an embodiment, each of these networks, the asset network 101, the affiliated organization network 103 and the agent network 105 may be generated to form a verifiable asset network (alternatively referred as the system 100) as a decentralized network using a block chain mechanism. The decentralized network enables interaction between the entities of the network and each network is generated for a specific purpose.

In an embodiment, the one or more users 107 and the one or more mobile assets 109 willing to avail services from the system 100 may onboard with the asset network 101. The process of onboarding the one or more users 107 and the one or more mobile assets 109 is illustrated in FIG. 1b.

Figure 1B:
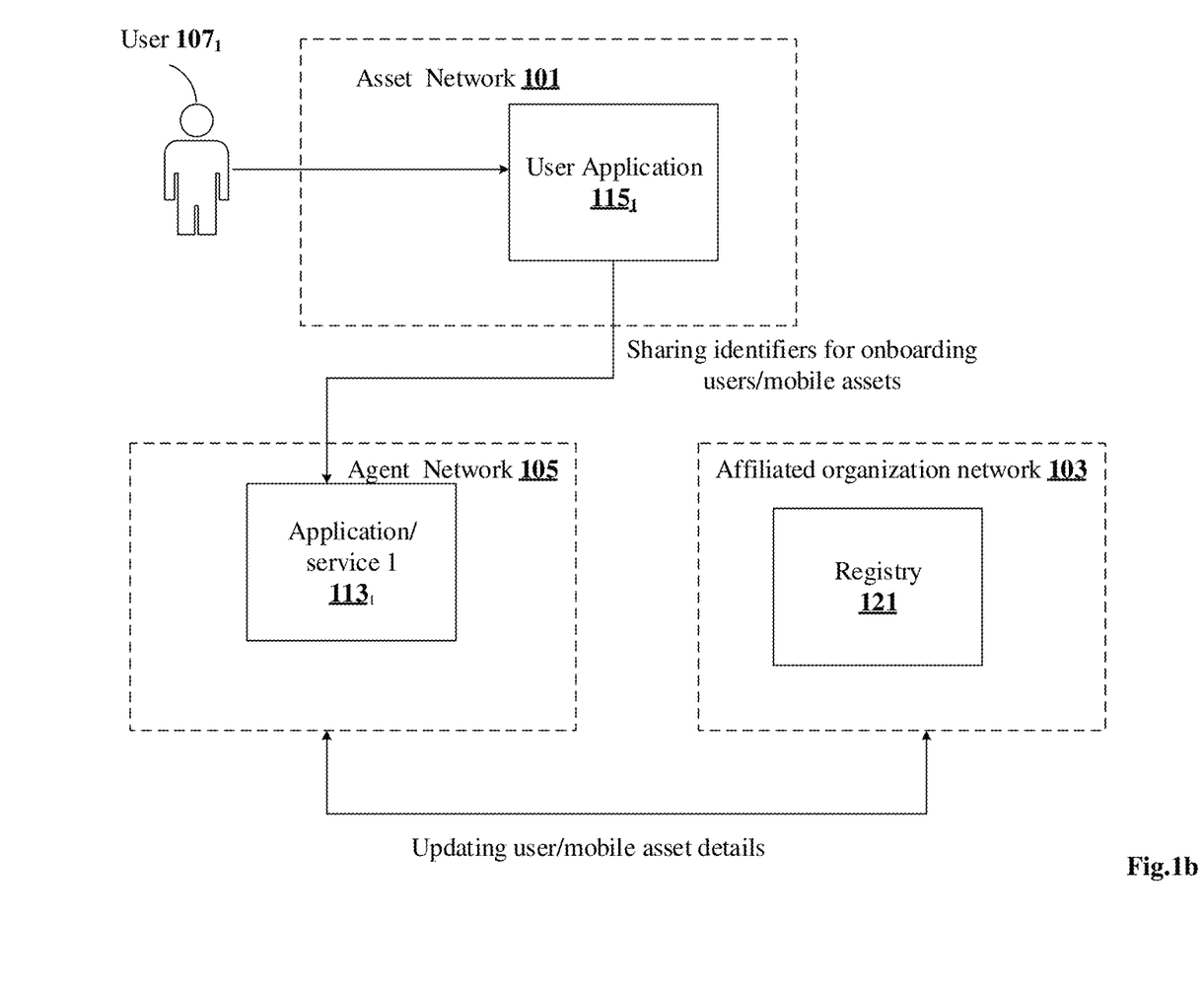
FIG. 1b illustrates a process of onboarding one or more users and the one or more mobile assets with asset network in accordance with some embodiments of the present disclosure.

As shown in FIG. 1b, the user 1071 may be a "driver" who wishes to provide the a mobile asset (e.g., mobile asset $109_1$ of FIG. 1a) "car" for a specific purpose. In another embodiment, the user $107i$ may request a mobile asset $109i$ to travel from one location to another location. The owner of the mobile asset $109i$ may enroll as a "driver" to utilize his/her mobile asset $109i$ for specific purposes. The asset network 101 enables the owner of the mobile asset $109i$ to onboard with the asset network 101. The asset network 101 may also allow the owner of the mobile asset $109i$ to delegate the ability to onboard and commission the mobile asset $109i$ for consumption. In an embodiment, there may be specific rules for consumption of the mobile asset $109i$ as set by the affiliated organization network 103. The owner of the mobile asset $109i$ should agree to these rules to commission his/her mobile asset $109i$ for consumption. The owner may revoke his/her consent to these rules when required and post this the mobile asset $109i$ may not be made available for consumption.

The process for onboarding the user $107_1$ with the asset network 101 is as described below.

At first, the user $107_1$ may provide a request for credentials from a road transport authority to prove that the user $107_1$ possess a valid driving license to use specific types of mobile assets 109. Thereafter, the authority may issue a credential in the form of an identifier which may be cryptographically verified using a mechanism such as zero-knowledge proof mechanism. The advantage of the zero-knowledge proof mechanism is that the actual data is not disclosed as part of the verification process. Further, the user $107_1$ may share the credential through the user application $115_1$ to the agent network 105. The managing application [application/service 1 $113_1$] in the agent network 105 may verify the credential along with other historic details of the user $107_1$ received from the affiliated organization network 103 to check if this user $107_1$ is blacklisted or not. If the user $107_1$ is not blacklisted and upon successful verification of the user $107_1$ based on the credential, the user $107_1$ may be on-boarded with the asset network 101. The details of the on-boarded user $107_1$ may be stored in the registry 121 of the affiliated organization network 103. In an embodiment, the managing application $113_1$ may provide a first identifier to the user $107_1$ after onboarding the user 107 with the asset network 101. The first identifier may be maintained in the user wallet $102_1$ of the user $107_1$ in the mobile device of the user $107_1$. The first identifier may be valid for a predefined time period.

The process for onboarding the one or more mobile assets 109 with the asset network 101 is as described below.

At first, the owner of the mobile asset $109_1$ may request proof from the authority that his/her mobile asset $109_1$ is eligible for consumption for specific purposes. The authority may issue a credential in the form of decentralized identifier which may be cryptographically verified using a verification mechanism such as zero-knowledge proof mechanism. The owner may provide the credential with the managing application, application/service 1 $113_1$ in the agent network 105 for verification purpose. Once the credential is verified by the managing application $113_1$, the mobile asset $109_1$ may be on boarded onto the asset network 101. Further, the owner may share his/her consent or delegate someone else to share the consent to enable availability of his/her mobile asset $109_1$ as per the rules defined in the affiliated organization network 103. Thereafter, the managing application $113_1$ may verify the mobile asset $109_1$ for approved rules as per the rules of engagement defined in the affiliated organization network 103. Upon successful verification, the managing application $113_1$ may issue a second identifier to the mobile asset 109. The second identifier may be stored in the mobile asset wallet $104_1$ associated with the edge device $117_1$.

Figure 1C:
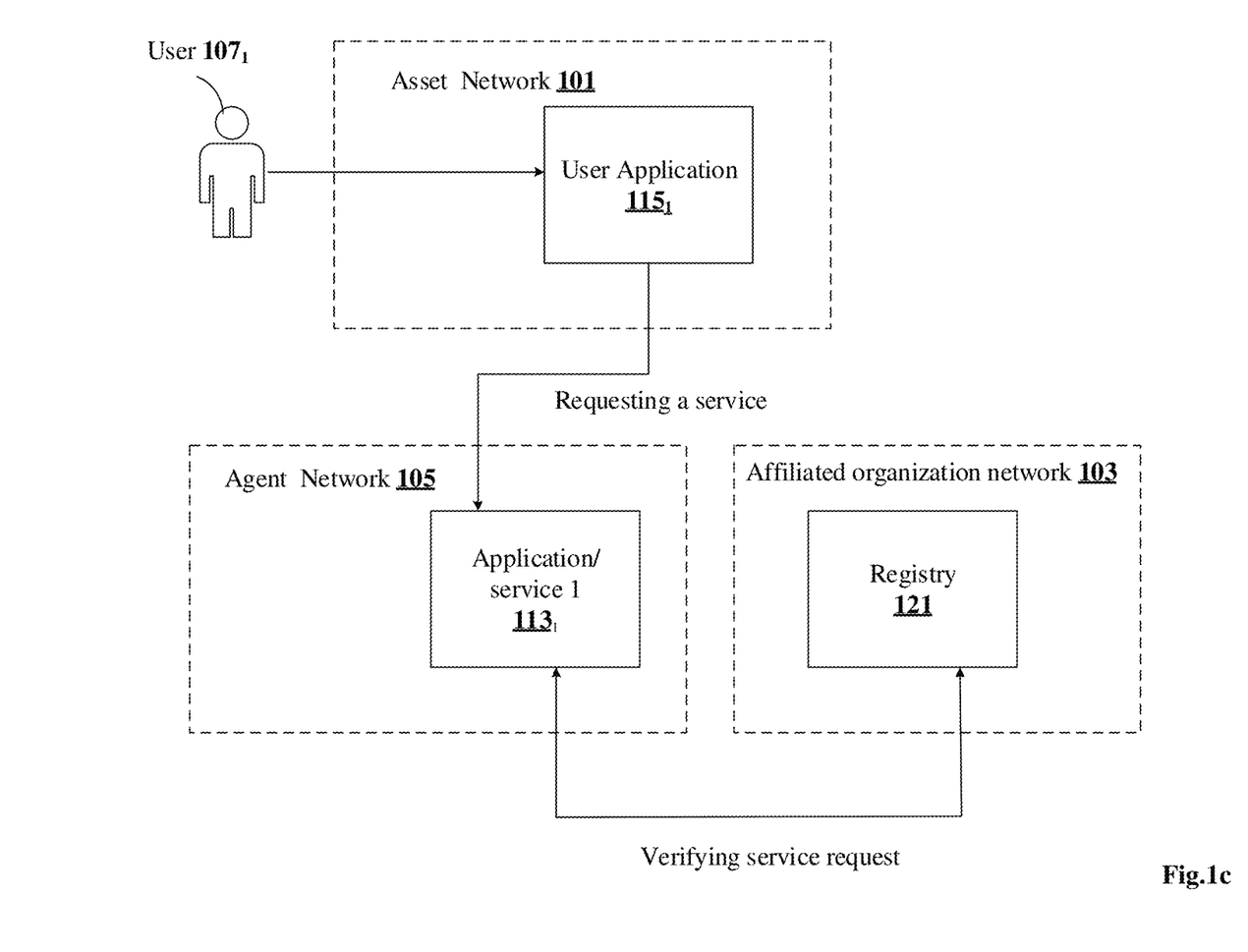
FIG. 1c illustrates a process for providing a service request for using a mobile asset in accordance with some embodiments of the present disclosure.

In an embodiment, once the one or more users 107 and the one or more mobile assets 109 are on-boarded with the asset network 101, the user $107_1$ may provide a service request for consumption of one or more mobile assets 109 which is illustrated in FIG. 1c.

As illustrated in FIG. 1c, the user $107_1$ may use the user application $115_1$ to place the service request for a "ride". The service request is transmitted to the agent network 105, which is hosting decentralized applications 113 such as application 1, application 2 and application n. The managing application, application/service 1 113₁ in the agent network 105 may receive the service request from the user application 115 and verify if the service request can be serviced based on rules defined for service offering in the affiliated organization network 103. The user 107₁ may send a service request along with location information and purpose information comprising usage details of the one or more mobile assets 109 though the user application 115₁. The managing application 113₁ of the agent network 105 upon receiving the service request may verify if the purpose stated by the user 107₁ is within the scope of usage patterns defined in the registry 121 hosted by the affiliated organization network 103. The managing application 113₁ may also verify if the location information provided by the user 107₁ is within the limits and the available mobile assets 109 are permitted to operate in the mentioned location. Post these verification, the managing application 113₁ may accept the service request and verify if user 107₁ has specified any preference for using the mobile asset 109 and the time of request. Based on the preference and the time of request, the managing application 113₁ may prioritize the service request. Further, the service request may also be prioritized based on availability of eligible users, availability of eligible mobile assets 109 to process the service request, and their proximity to the user 107₁ who has provided the service request.

Figure 1D:
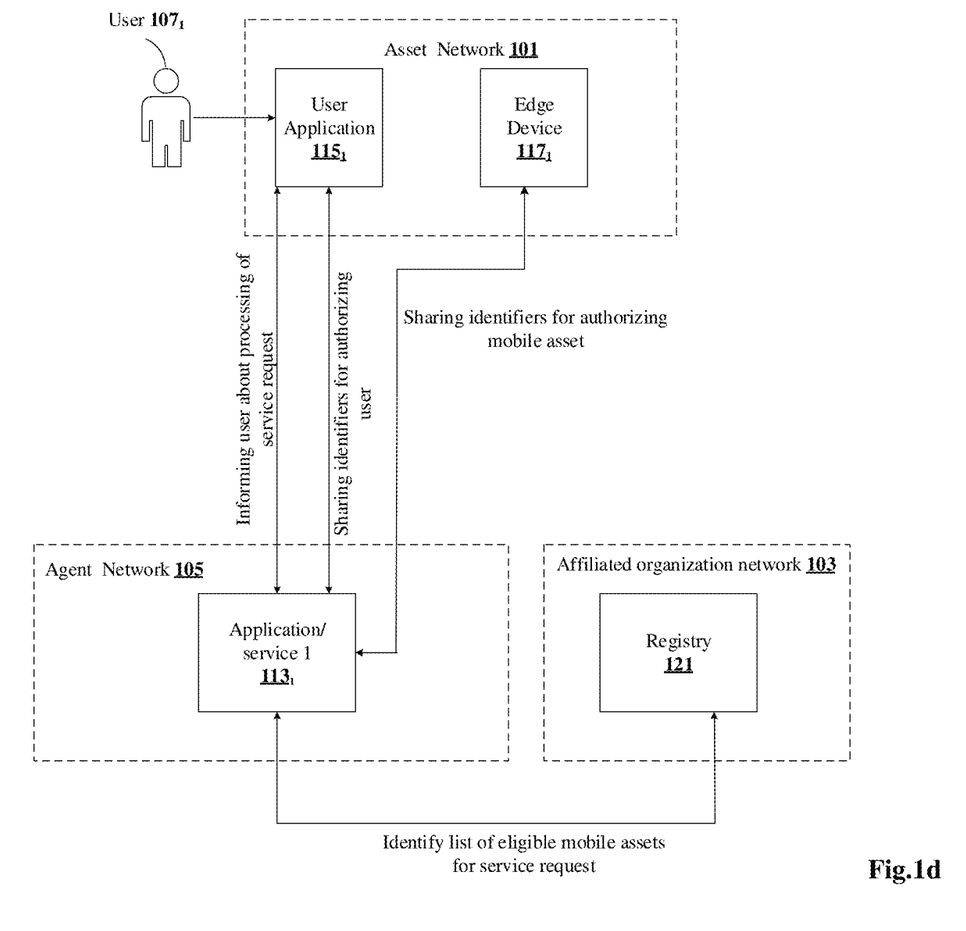
FIG. 1d illustrates a process for allocating a mobile asset for the service request in accordance with some embodiments of the present disclosure.

In an embodiment, once the service request is prioritized, the managing application 113₁ may verify for one or more mobile assets 109 eligible to be consumed for the service request as illustrated in FIG. 1*d*.

As illustrated in FIG. 1*d*, as an example, the mobile asset 109₁ may be a "driverless car". In this scenario, the managing application, application/service 1 113₁ may verify one or more parameters such as eligibility of the car for the service request, state of the car to provide the service (such as did it undergo interior cleaning post completion of previous services), are the interior systems working properly, did it incur any delays in completing the service request assigned to it previously, and/or the like may be checked prior to retrieving the mobile asset 109₁ for the service request or for servicing the service request. The managing application 113₁ may retrieve these information from the registry 121 of the affiliated organization network 103 based on which the managing application 113₁ may identify list of eligible mobile assets 109 for servicing the request. Once the mobile asset 109₁ among the list of eligible mobile assets 109 is retrieved from the registry 121 based on verification of the parameter, the mobile asset 109₁ may be allocated for the service request. Once the mobile asset 109₁ is allocated, the managing application 113₁ may inform user 107₁ about processing of the service request. Thereafter, the managing application 113₁ may generate the first identifier and the second identifier. The first identifier and the second identifier may be generated based on identity details of the user 107₁, identity details of the mobile asset 109₁, the purpose of the service request, eligibility of the user 107 to consume the mobile asset 109₁ for the requested service, eligibility of the mobile asset 109₁ to be consumed for the requested service. The first identifier and the second identifier may be cryptographically encrypted using public key recipients of the identifiers. The first identifier may be provided to the user 107₁ and the second identifier may be provided to the edge device 117₁ associated with the allocated mobile device which will be used for servicing the service request.

Figure 1E:
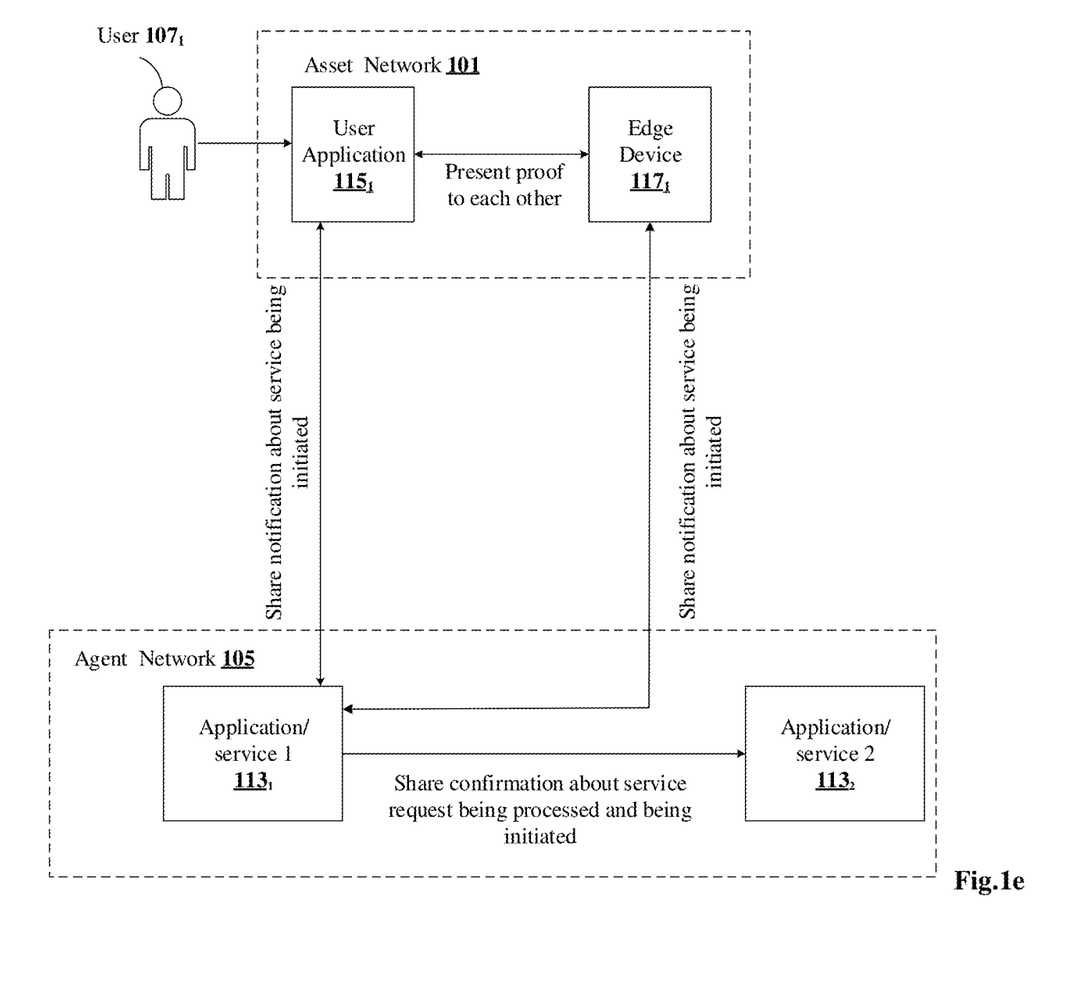
FIG. 1e illustrates a process for initiating a service corresponding to the service request in accordance with some embodiments of the present disclosure.

In an embodiment, once the mobile asset 109₁ is allocated for the service request, the managing application 113₁ may initiate the service corresponding to the service request as illustrated in FIG. 1*e*.

As illustrated in FIG. 1*e*, the user 107₁ may share the first identifier through the user application 115₁ to the mobile asset application associated with the allocated mobile asset 109₁ to use the mobile asset 109₁. The mobile asset application associated with the edge device 117 may verify the first identifier shared by the user application 115₁ using zero knowledge proof mechanism. Once the first identifier is successfully verified, the user 107₁ may use the mobile asset 109₁ for the assigned service request.

Similarly, the mobile asset 109₁ allocated to the service request may share the second identifier to the user 107₁ who has provided the service request to provide authorization of the mobile asset 109₁ to be consumed for the service request. The user application 115₁ and the mobile wallet application may verify the exchange of the first identifier and the second identifier. Based on successful verification, the managing application 113₁ may initiate the service associated with the service request. Further on successful verification, the user application 115₁ and the mobile wallet application may notify the status of the verification and initiation of the service to the managing application 113₁ based on which the service is initiated. Once the service is initiated by the managing application, application/service 1 113₁, the managing application 113₁ may share update on the service request to application/service 2 113₂ [a status tracking application].

Figure 1F:
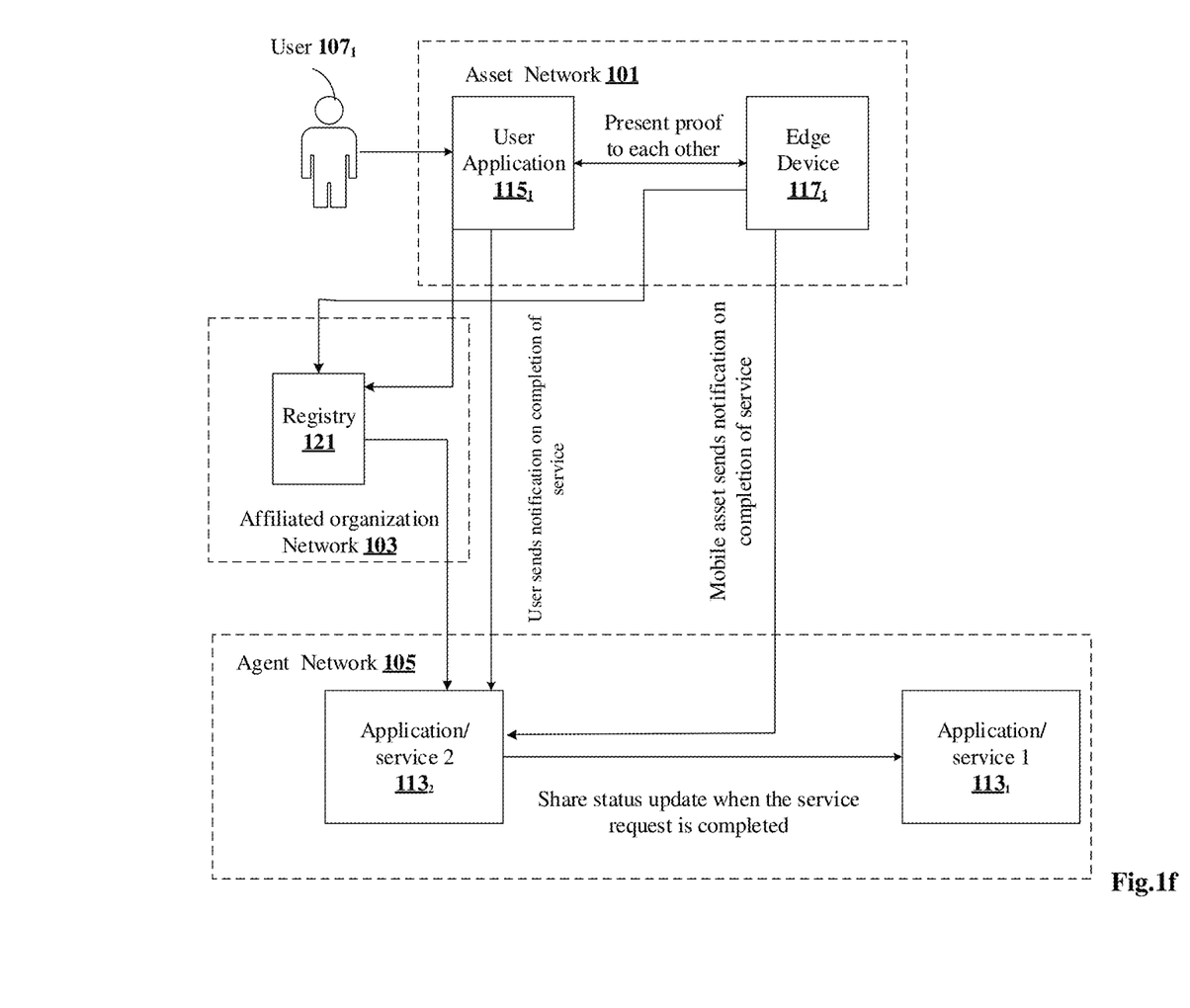
FIG. 1f illustrates a process for tracking status of the service in accordance with some embodiments of the present disclosure.

In an embodiment, once the service is initiated, the service may be tracked using the status tracking application in the agent network 105 which is illustrated in FIG. 1*f*.

As illustrated in FIG. 1*f*, the status tracking application 113₂, application may continuously interact with the mobile asset application of the mobile asset 109₁ allocated for the service request of the user 107₁ and the user application 115 associated with the user 107₁ to verify validity of the first identifier and the second identifier. In an embodiment, proofs associated with location of the user 107₁ and the mobile asset 109₁ may be stored in the registry 121. The status tracking application may receive information associated with the user 107₁ who has provided the service request and the allocated mobile asset 109₁ from the registry 121 in the affiliated organization network 103. The status tracking application may also receive continuously the location of the mobile asset 109₁ from the registry 121 and compare the information with the service request to confirm the correct location of the mobile asset 109₁. Further, once the service is completed, the status tracking application may check current location of the mobile asset 109₁ with the service request to confirm the completion of the service. Thereafter, the status tracking application may transmit a notification to the user 107₁ and the mobile asset 109₁ to confirm the completion of the service. On receiving the confirmation from the user 107₁ through the user application 115₁ and confirmation from the mobile asset 109₁ through the mobile asset application, the status tracking application 113₂ application 2 may update the service as completed and notifies the managing application, application/service 1 113₁ on completion of the service.

In an embodiment, once the service is completed, the status of the service is updated in the managing application 113₁. The managing application 113₁ may transmit a notification to another application hosted in the agent network 105 such as feedback initiating application. The process of initiating the feedback is illustrated in FIG. 1*g*.

Figure 1G:
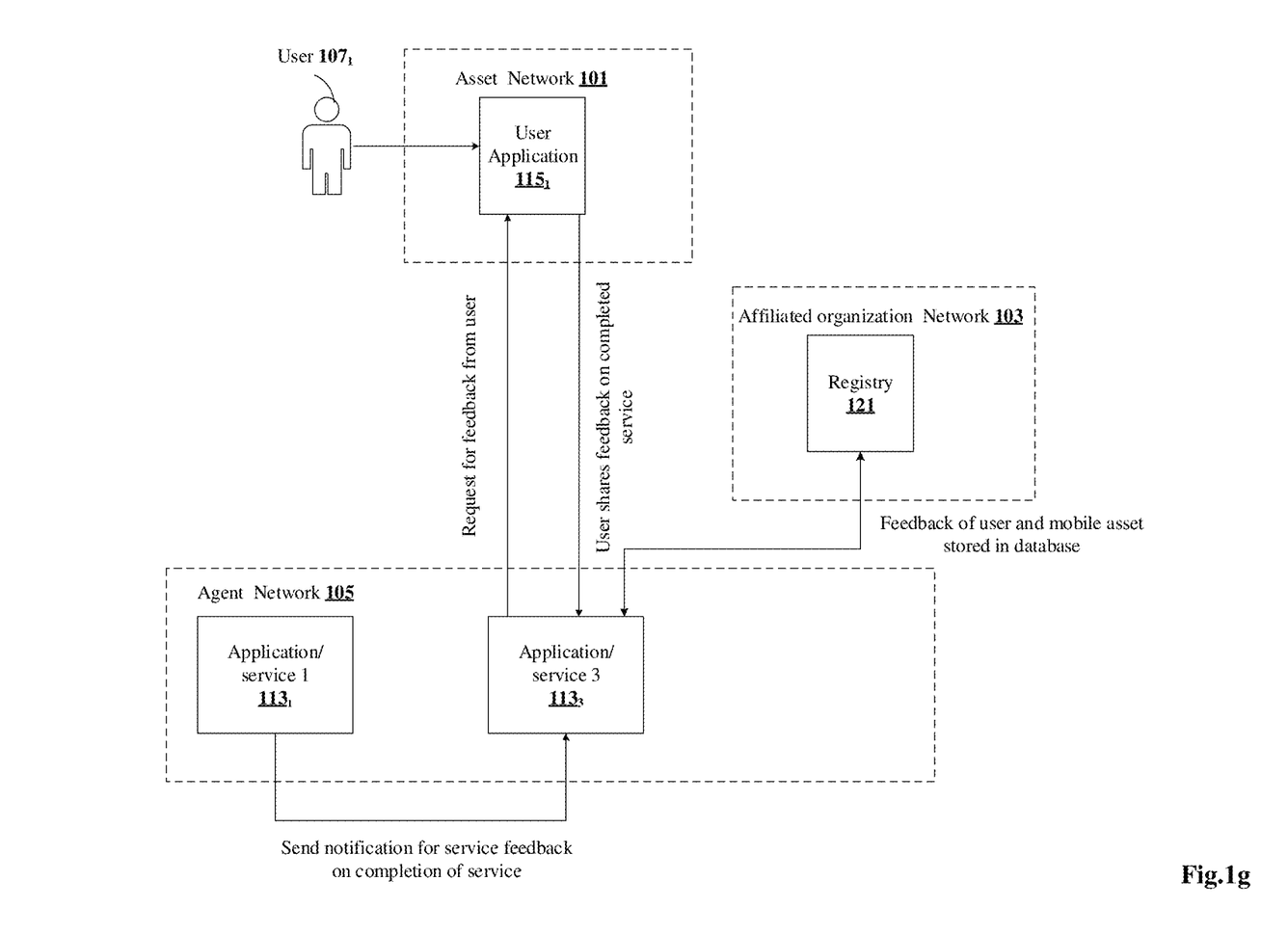
FIG. 1g illustrates a process for initiating feedback for the service in accordance with some embodiments of the present disclosure.

As illustrated in FIG. 1g, the feedback initiation application [application/service 3 $113_3$] upon receiving feedback initiation request from the managing application, application/service 1 $113_1$, the feedback initiation application may initiate the feedback. The feedback initiation application may request the user $107_1$ to provide the feedback on the service. The user $107_1$ may share any concern related to the service. Further, the feedback received from the user $107_1$ may be stored in the registry 121 of the affiliated organization network 103. The feedback may be used to provide rating for the user $107_1$ providing the service.

In an embodiment, in the present disclosure, the system 100 (the network of verifiable asset) manages entire life cycle of the mobile assets 109 using decentralized identifiers. Thus, enabling trust and transparency among the participating entities in the network. Further, during the process of commissioning the mobile assets 109 to the asset network 101, various details of the mobile assets 109 are verified using a challenge mechanism such as a zero knowledge proof mechanism to confirm if it is a valid mobile asset 109, which can be on boarded onto the asset network 101. The various details of the mobile asset 109 may include, type of the mobile asset 109, ownership details, purpose of usage of the mobile asset 109, duration limit set for the usage of the mobile asset 109, type of users 107 permitted to use the mobile asset 109 and any other verification, which are defined in consensus by the system 100. Similar process may be applied while decommissioning the mobile asset 109 from the system 100.

Further, on boarding and de-boarding of the mobile assets109 for consumption purpose is also performed using the zero-knowledge proof mechanism. The mobile asset 109 will only be available for consumption after the mobile asset 109 has been commissioned onto the asset network 101 and on boarded to enable its visibility for consumption. The owner of the mobile asset 109 or someone who has been delegated by the owner of the mobile asset 109 may also perform on boarding of the mobile asset 109. During the process of onboarding, the owner or the delegated entity may need to prove ownership of the mobile asset 109 by sharing identifiers using the zero-knowledge proof mechanism. Once on boarded, the system 100 may generate identifiers for assigning the mobile asset 109 for a specific purpose and a specific type of user 107. Similar process may be employed while de-boarding the mobile asset 109 thus making it unavailable for consumption. This may happen for various reasons such as the mobile asset 109 being sold off, end of life of the mobile asset 109, or mobile asset 109 has been termed unfit for consumption for the purpose identified in the service request.

Figure 2:
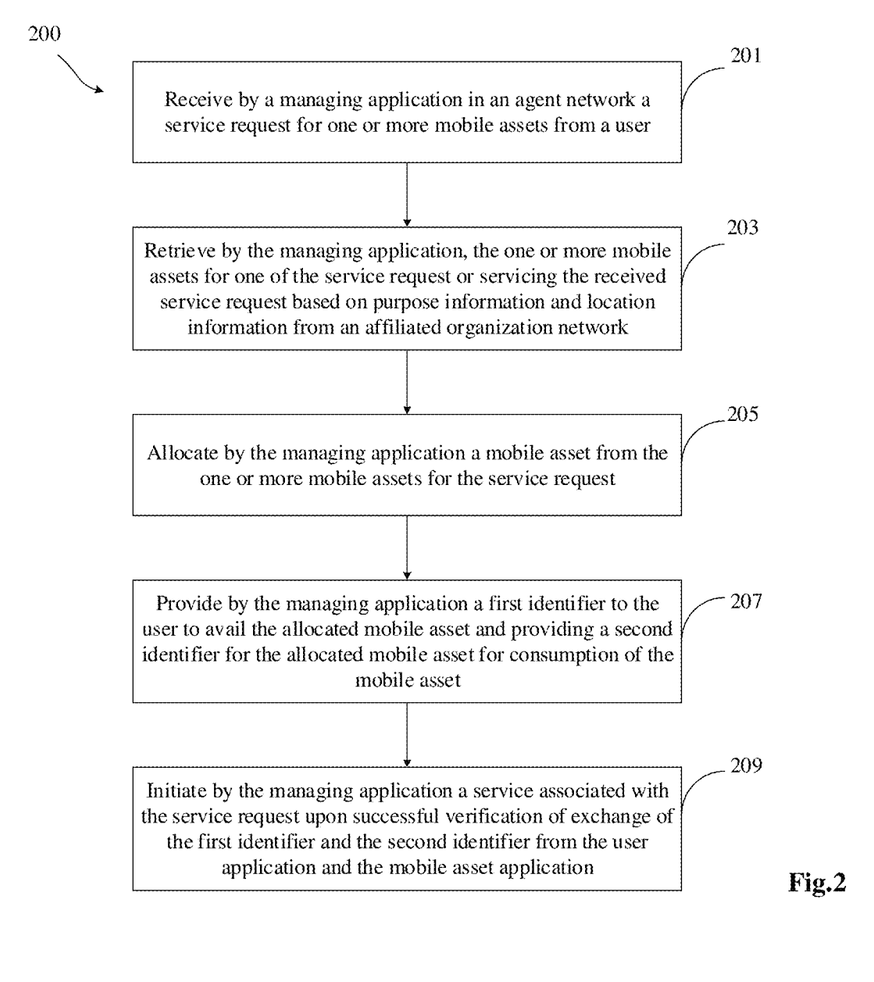
FIG. 2 shows a flowchart illustrating a method for managing the mobile asset using a decentralized network in accordance with some embodiments of the present disclosure.

FIG. 2 shows a flowchart illustrating a method for managing mobile assets using a decentralized network in accordance with some embodiments of the present disclosure.

As illustrated in FIG. 2, the method 200 includes one or more blocks illustrating a method for managing mobile assets 109 in a decentralized network. The method 200 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 201, the method may include receiving by a managing application $113_1$ in an agent network 105 in the system 100 a service request for one or more mobile assets 109 from a user 107. the agent network 105 may be created to host decentralized applications 113 by organization providing the decentralized applications 113. The service request may be associated with a purpose information comprising usage details of the one or more mobile assets 109 and a location information.

At block 203, the method may include retrieving by the managing application $113_1$ the one or more mobile assets 109 for one of the service request or for servicing the received service request. The managing application $113_1$ may retrieve the one or more mobile assets 109 based on the purpose information and the location information provided by the user $107_1$ while the service request is provided. The managing application $113_1$ may retrieve the one or more mobile assets 109 from the affiliated organization network 103.

At block 205, the method may include allocating a mobile asset $109_1$ from the one or more mobile assets 109 for the service request. The mobile asset $109_1$ among the one or more mobile asset 109 may be selected upon verifying availability of the eligible mobile asset $109_1$ to process the service request, and the proximity of the mobile asset $109_1$ to the user $107_1$ who has provided the service request.

At block 207, the method may include providing by the managing application $113_1$, a first identifier to the user $107_1$ to avail the allocated mobile asset $109_1$ and providing a second identifier for the allocated mobile asset 109 for consumption of the mobile asset $109_1$. The first identifier and the second identifier are active for a predefined time period. The first identifier and the second identifier are generated based on identity details of the user $107_1$, identity details of the mobile asset $109_1$, the purpose of the service request, eligibility of the user $107_1$ to consume the mobile asset $109_1$ for the requested service, eligibility of the mobile asset $109_1$ to be consumed for the requested service. Thereafter, a challenge process is implemented wherein the first identifier and the second identifier are presented by the user $107_1$ and the allocated mobile asset $109_1$ to each other. Thereafter, the exchange of the first identifier and the second identifier is verified by a user application $115_1$ through which the service request is provided, and a mobile asset application associated with the allocated mobile asset $109_1$.

At block 209, the method may include initiating by the managing application $113_1$ a service associated with the service request upon successful verification of the exchange of the first identifier and the second identifier from the user application $115_1$ and the mobile asset application. Once the service is initiated, the managing application $113_1$ may check status of the service. Once the service is completed, the user application $115_1$ and the mobile asset application may notify the managing application $113_1$ about completion of the service which is recorded by the managing application $113_1$ and also the status information is stored in the registry 121 of the affiliated organization network 103. Thereafter, a feedback initiating application in the agent network 105, upon completion of the service, may initiate feedback and receive feedback from the user $107_1$ for the service associated with the service request wherein the received feedback is stored in a registry 121 of the affiliated organization network 103.

Exemplary Scenario

In a car rent service industry, several autonomous cars are operated. The present disclosure may be implemented in this scenario in order to manage the mobile assets 109 which are "autonomous cars". Users 107$_1$ willing to on-board their autonomous cars specify the purpose for their consumption and onboard the autonomous cars with the asset network 101. The users 107$_1$ willing to use the autonomous cars may provide a service request through a user application 115$_1$ associated with a mobile device of the user 107$_1$ along with purpose of the service request and location information. The location information may include location where the user 107$_1$ may require the autonomous car to travel to. The user 107$_1$ may also indicate the time duration for which the "autonomous car" is required. The managing application 113$_1$ of the agent network 105 receives the service request from the user application 115$_1$ and processes the service request. The managing application 113$_1$ verifies the service request by verifying eligibility of the user 107$_1$ providing the service request, eligibility of one or more autonomous cars suiting the requirements of the service request and verifying availability of the user 107$_1$ for consuming the requested service.

Thereafter, the managing application 113$_1$ identifies one or more mobile assets 109 from the affiliated organization network 103 which matches the service request. As an example, there may be three autonomous cars, "autonomous car 1", "autonomous car 2" and "autonomous car 3". The managing application 113$_1$ may allocate the mobile asset 109$_1$ among the one or more mobile assets 109 for the service request. The managing application 113$_1$ may allocate the "autonomous car 2" to the service request as the "autonomous car 2" matches the purpose and the location information provided by the user 107$_1$. Once the "autonomous car 2" is verified by the managing application 113$_1$ for servicing the service request, the "autonomous car 2" is provided with direction details to reach location of the user 107$_1$ who has provided the service request. The managing application 113$_1$ issues a first identifier to the user 107$_1$ and the second identifier to the "autonomous car 2". Once the "autonomous car 2" reaches the location of the user 107$_1$, the "autonomous car 2" and the user 107$_1$ exchange the first identifier and the second identifier. The user application 115 and the mobile asset application verifies the first identifier and the second identifier for authorizing the user 107$_1$ to use the "autonomous car 2" and for authorizing the "autonomous car 2" to be used or consumed for the service request provided by the user 107$_1$ using zero knowledge proof mechanism. Since zero knowledge proof mechanism is used, no actual data of either the mobile asset 109$_1$ or the user 107$_1$ is disclosed. Thereafter, the managing application 113$_1$ initiates the service wherein the autonomous car 2 is used by the user 107$_1$. Thereafter, the managing application 113$_1$ initiates feedback from the user 107$_1$ for the service provided. During the process of requesting a service till sharing of feedback on the service, only relevant information will be captured in the registry 121 without disclosing any private information of the mobile asset 109$_1$ and the user 107$_1$.

Figure 3:
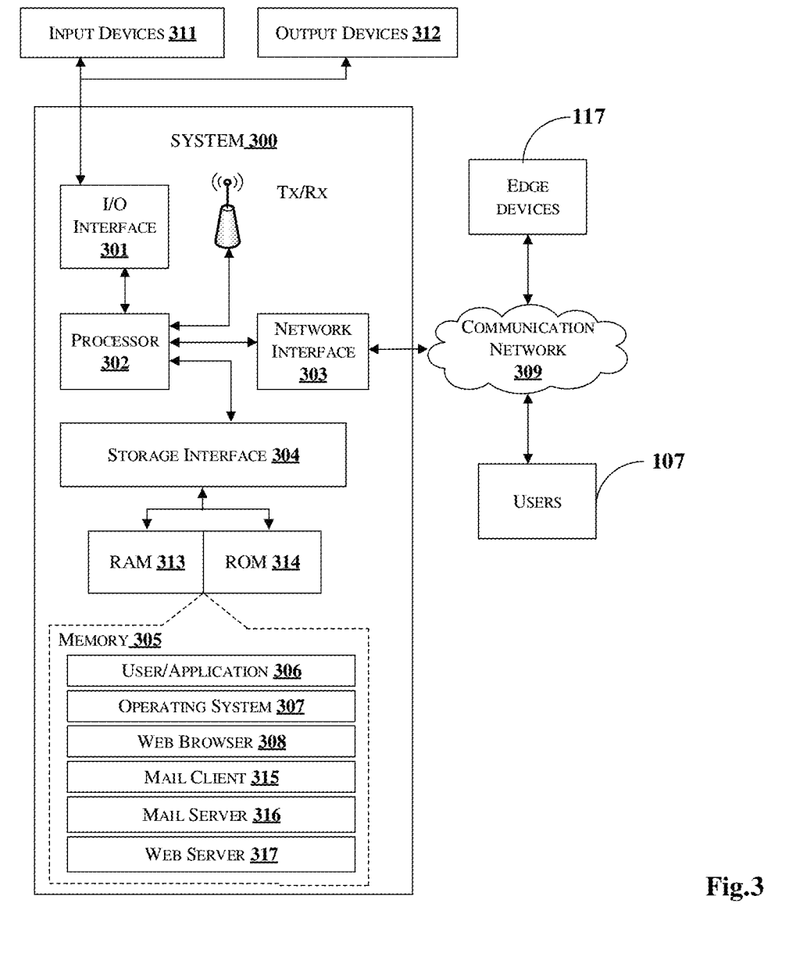
FIG. 3 illustrates a block diagram of an exemplary computer system for implementing embodiments consistent with the present disclosure.

FIG. 3 illustrates a block diagram of an exemplary computer system 300 for implementing embodiments consistent with the present disclosure. In an embodiment, the computer system 300 may be a system 100, which is used for managing mobile assets 109 using a decentralized network. The computer system 300 may include a central processing unit ("CPU" or "processor") 302. The processor 302 may comprise at least one data processor for executing program components for executing user or system-generated business processes. In some embodiments, the processor 302 may be configured in each application of the network of verifiable assets. The processor may include modules and data which may be stored within the memory. In an example, the modules communicatively coupled to the processor 302, may also be present outside the memory and implemented as hardware. As used herein, the term modules may refer to an Application Specific Integrated Circuit (ASIC), an electronic circuit, a processor 302 (shared, dedicated, or group) and memory that execute one or more software or firmware programs, a combinational logic circuit, and/or other suitable components that provide the described functionality.

The processor 302 may include specialized processing units such as integrated system (bus) controllers, memory management control units, floating point units, graphics processing units, digital signal processing units, etc.

The processor 302 may be disposed in communication with one or more input/output (I/O) devices (311 and 312) via I/O interface 301. The I/O interface 301 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 301, the computer system 300 may communicate with one or more I/O devices 311 and 312.

In some embodiments, the processor 302 may be disposed in communication with a communication network 309 via a network interface 303. The network interface 303 may communicate with the communication network 309. The network interface 303 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 309 can be implemented as one of the several types of networks, such as intranet or Local Area Network (LAN) and such within the organization. The communication network 309 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 309 may include a variety of network devices, including routers, bridges, servers, computing devices, storage devices, etc.

In some embodiments, the processor 302 may be disposed in communication with a memory 305 (e.g., RAM 313, ROM 314, etc. as shown in FIG. 3) via a storage interface 304. The storage interface 304 may connect to memory 305 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 305 may store a collection of program or database components, including, without limitation, user/application 306, an operating system 307, a web browser 308, a mail client 315, a mail server 316, a web server 317, and the like. In some embodiments, computer system 300 may store user/application data 306, such as the data, variables, records, etc. as described in this invention. Such databases may be implemented as fault-tolerant, relational, scalable, secure databases such as Oracle® or Sybase®.

The operating system 307 may facilitate resource management and operation of the computer system 300. Examples of operating systems 307 include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™ VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 600, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure discloses a system and a method for managing mobile assets using a decentralized network.

In an embodiment, in the present disclosure, consent or approval from the mobile asset owner is considered to consume the mobile asset for a specific purpose and for specific time duration and hence avoids misuse of the mobile asset.

In an embodiment, the system comprises of three networks interaction among the three networks for managing the mobile assets. Therefore, there is no one entity involved for managing the mobile asset and hence enhances trust among the participants, as no one entity will be able to centrally manage and manipulate the entire network for personal gains.

In an embodiment, the present disclosure discloses a system which provides a neutral platform for any asset owner who has on boarded and commissioned their asset to process the service request that suits the purpose defined for their asset and hence not biased.

In an embodiment, the present disclosure discloses a method for managing allocation of mobile assets, authentication of consumers and mobile assets, tracking status of mobile assets and retrieving feedback of service provided thereby enhancing efficiency with minimal manual intervention.

In an embodiment, due to the system in place, the end user is provided with more options to avail shared services without being dependent on any specific service provider.

In an embodiment, the system provides customized services to the end user without disclosing on the private information of the consumer and hence secure.

In an embodiment, the system allows the mobile asset owners to delegate the ability to onboard and commission their mobile assets in a secure manner.

In an embodiment, in the present disclosure the user of the mobile asset and the mobile asset is verified using identifiers thereby providing a secure service.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | System |
| 101 | Asset Network |
| 103 | Affiliated organization network |
| 105 | Agent network |
| 107 | Users |
| 109 | Mobile asset |
| 111 | Organizations |
| 113 | Applications |
| 114 | Block chain ledger |
| 115 | User application |
| 117 | Edge device |
| 119 | Node |
| 121 | Registry |
| 123 | Block chain ledger |
| 125 | Node |
| 127 | Block chain ledger |
| 300 | Exemplary computer system |
| 301 | I/O Interface of the exemplary computer system |
| 302 | Processor of the exemplary computer system |
| 303 | Network interface |
| 304 | Storage interface |
| 305 | Memory of the exemplary computer system |
| 306 | User/Application |
| 307 | Operating system |
| 308 | Web browser |
| 309 | Communication network |
| 311 | Input devices |
| 312 | Output devices |
| 313 | RAM |
| 314 | ROM |
| 315 | Mail Client |
| 316 | Mail Server |
| 317 | Web Server |

What is claimed is:

1. A system for managing mobile assets using a decentralized network, the system comprising:
an asset network;
an affiliated organization network; and
an agent network;
wherein the asset network, the affiliated organization network, and the agent network are distinct networks that together form a verifiable asset network as the decentralized network using a block-chain mechanism,
wherein the agent network hosts decentralized applications by organizations in the affiliated organization network that provides the decentralized applications, and
wherein, a managing application in the agent network is configured to:
receive a service request for one or more mobile assets, from a user, wherein the service request is associated with a purpose information comprising usage details of the one or more mobile assets and a location information, wherein the one or more mobile assets, one or more users associated with one or more mobile assets and one or more devices associated with each of the one or more users are registered with the asset network;
retrieve the one or more mobile assets for one of the service request or servicing the received service request based on the purpose information and the location information from the affiliated organization network upon verification of the service request;
allocate a mobile asset from the one or more mobile assets for the service request;
provide a first identifier to the user to avail the allocated mobile asset and provide a second identifier for the allocated mobile asset for consumption of the mobile asset, wherein the first identifier and the second identifier is presented by the user and the allocated mobile asset with each other, and wherein the exchange of the first identifier and the second identifier is verified by a user application through which the service request is provided and a mobile asset application associated with the allocated mobile asset, wherein the user application is associated with the user, and wherein the mobile asset application is associated with the mobile asset; and
initiate a service associated with the service request upon successful verification of the exchange of the first identifier and the second identifier from the user application and the mobile asset application.

2. The system as claimed in claim 1, wherein the agent network is created to host managing applications, including the managing application, by organizations providing these managing applications.

3. The system as claimed in claim 1, wherein the asset network is hosted by one or more enterprises affiliated to provide mobile assets-based services.

4. The system as claimed in claim 1, wherein the affiliated organization network is created by owners of the one or more mobile assets or organizations or associations providing the one or more mobile assets for consumption.

5. The system as claimed in claim 1, wherein the first identifier and the second identifier are active for a predefined time period.

6. The system as claimed in claim 1, wherein the managing application verifies the service request by verifying eligibility of the user providing the service request, eligibility of one or more mobile assets suiting the requirements of the service request and verifying availability of the user for consuming the requested service.

7. The system as claimed in claim 1, wherein the managing application generates the first identifier and the second identifier based on at least one of: identity details of the user, identity details of the mobile asset, the purpose of the service request, eligibility of the user to consume the mobile asset for the requested service, or eligibility of the mobile asset to be consumed for the requested service.

8. The system as claimed in claim 1, further comprising:
a status tracking application in the agent network to track a status of the service through the user application and the mobile asset application.

9. The system as claimed in claim 1, further comprising:
a feedback initiating application in the agent network to initiate a feedback request upon completion of the service, to receive a feedback from the user for the service associated with the service request, wherein the received feedback is stored in a registry of the affiliated organization network.

10. A method for managing mobile assets using a decentralized network, the method comprising:
receiving, by a managing application in an agent network, a service request for one or more mobile assets, from a user, wherein the service request is associated with a purpose information comprising usage details of the one or more mobile assets and a location information, wherein the one or more mobile assets, one or more users associated with one or more mobile assets and one or more devices associated with each of the one or more users are registered with an asset network;

retrieving, by the managing application, the one or more mobile assets for one of the service request or servicing the received service request based on the purpose information and the location information from an affiliated organization network upon verification of the service request;

allocating, by the managing application, a mobile asset from the one or more mobile assets for the service request;

providing, by the managing application, a first identifier to the user to avail the allocated mobile asset and providing a second identifier for the allocated mobile asset for consumption of the mobile asset, wherein the first identifier and the second identifier is presented by the user and the allocated mobile asset to each other, and wherein the exchange of the first identifier and the second identifier is verified by a user application through which the service request is provided and a mobile asset application associated with the allocated mobile asset, wherein the user application is associated with the user, and wherein the mobile asset application is associated with the mobile asset; and initiating, by the managing application, a service associated with the service request upon successful verification of the exchange of the first identifier and the second identifier from the user application and the mobile asset application, wherein the asset network, the affiliated organization network, and the agent network are distinct networks that together form a verifiable asset network as the decentralized network using a block-chain mechanism, wherein the agent network hosts decentralized applications by organizations in the affiliated organization network that provides the decentralized applications.

11. The method as claimed in claim 10, wherein the agent network is created to host managing applications, including the managing application, by organizations providing these managing applications.

12. The method as claimed in claim 10, wherein the asset network is hosted by one or more enterprises affiliated to provide mobile assets-based services.

13. The method as claimed in claim 10, wherein the affiliated organization network is created by owners of the one or more mobile assets or organizations or associations providing the one or more mobile assets for consumption.

14. The method as claimed in claim 10, wherein the first identifier is encrypted with a public key of a recipient of the first identifier prior to sharing the first identifier.

15. The method as claimed in claim 10, wherein verifying the service request comprises verifying eligibility of the user providing the service request, eligibility of one or more mobile assets suiting the requirements of the service request and verifying availability of the user for consuming the requested service.

16. The method as claimed in claim 10, wherein the first identifier and the second identifier are generated based on at least one of: identity details of the user, identity details of the mobile asset, the purpose of the service request, eligibility of the user to consume the mobile asset for the requested service, or eligibility of the mobile asset to be consumed for the requested service.

17. The method as claimed in claim 10, further comprising:
tracking a status of the service by a status tracking application in the agent network through the user application and the mobile asset application.

18. The method as claimed in claim 10, further comprising:
initiating a feedback request, by a feedback initiating application in the agent network, upon completion of the service, to receive a feedback from the user for the service associated with the service request, wherein the received feedback is stored in a registry of the affiliated organization network.

19. A non-transitory computer readable medium including instructions stored thereon that when processed by at least one processor causes the processor to manage mobile assets using a decentralized network by performing steps of:

receiving, by a managing application in an agent network, a service request from a user, wherein the service request is associated with a purpose information comprise usage details of the one or more mobile assets and a location information, wherein the one or more mobile assets, one or more users associated with one or more mobile assets and one or more devices associated with each of the one or more users are registered with an asset network;

retrieving one of the service request or servicing the received service request based on the purpose information and the location information from an affiliated organization network upon verification of the service request;

allocating a mobile asset for the service request;

providing a first identifier to the user to avail the allocated mobile asset and provide a second identifier for the allocated mobile asset for consumption of the mobile asset, wherein the first identifier and the second identifier is presented by the user and the allocated mobile asset with each other, and wherein the exchange of the first identifier and the second identifier is verified by a user application through which the service request is provided and a mobile asset application associated with the allocated mobile asset, wherein the user application is associated with the user, and wherein the mobile asset application is associated with the mobile asset; and initiating a service associated with the service request upon successful verification of the exchange of the first identifier and the second identifier from the user application and the mobile asset application;

wherein the asset network, the affiliated organization network, and the agent network are distinct networks that together form a verifiable asset network as the decentralized network using a block-chain mechanism, wherein the agent network hosts decentralized applications by organizations in the affiliated organization network that provides the decentralized applications.

* * * * *